US012589916B2

(12) United States Patent
Hamadene

(10) Patent No.: US 12,589,916 B2
(45) Date of Patent: Mar. 31, 2026

(54) BI-INJECTION MOLDED HOUSING OF A LOCKING CAP FOR A PHARMACEUTICAL VIAL, AND LOCKING CAP INCLUDING SUCH A HOUSING

(71) Applicant: A. Raymond et cie, Grenoble (FR)

(72) Inventor: Sofien Hamadene, Grenoble (FR)

(73) Assignee: A. Raymond et cie, Grenoble (FR)

( * ) Notice: Subject to any disclaimer, the term of this patent is extended or adjusted under 35 U.S.C. 154(b) by 182 days.

(21) Appl. No.: 18/422,836

(22) Filed: Jan. 25, 2024

(65) Prior Publication Data

US 2024/0253865 A1 Aug. 1, 2024

(30) Foreign Application Priority Data

Feb. 1, 2023 (FR) .................................. FR2300929

(51) Int. Cl.

| | |
|---|---|
| ***B65D 41/28*** | (2006.01) |
| ***A61J 1/14*** | (2023.01) |
| ***B65D 41/62*** | (2006.01) |
| ***B65D 43/16*** | (2006.01) |
| ***B65D 51/00*** | (2006.01) |
| ***B65D 51/18*** | (2006.01) |

(52) U.S. Cl.

CPC ............ *B65D 41/28* (2013.01); *A61J 1/1412* (2013.01); *B65D 41/62* (2013.01); *B65D 43/16* (2013.01); *B65D 51/002* (2013.01); *B65D 51/18* (2013.01); *B65D 2251/0021* (2013.01); *B65D 2251/0046* (2013.01); *B65D 2251/0075* (2013.01); *B65D 2543/00092* (2013.01)

(58) Field of Classification Search

CPC ........ B65D 41/28; B65D 41/62; B65D 43/16; B65D 51/002; B65D 51/18; A61J 1/1412

See application file for complete search history.

(56) References Cited

U.S. PATENT DOCUMENTS

| | | | | |
|---|---|---|---|---|
| 4,652,429 A * | 3/1987 | Konrad ................ | B65D 51/002 | 422/550 |
| 5,303,835 A * | 4/1994 | Haber .................. | B65D 51/241 | 215/276 |
| 7,097,057 B2 * | 8/2006 | Classens ............ | A61B 5/15003 | 220/254.1 |
| 2012/0160850 A1 * | 6/2012 | Gelibert ............... | B65D 55/063 | 220/315 |

FOREIGN PATENT DOCUMENTS

| | | |
|---|---|---|
| AU | 2013220588 B2 | 8/2013 |
| EP | 2464577 | 2/2018 |
| FR | 3098504 B1 | 6/2021 |

OTHER PUBLICATIONS

French Search Report for Application No. 2300929 dated Aug. 15, 2023, 3 pages.

* cited by examiner

*Primary Examiner* — James N Smalley
(74) *Attorney, Agent, or Firm* — TraskBritt

(57) ABSTRACT

A bi-injection molded housing of a locking cap for a pharmaceutical vial includes a first material forming an upper ring, legs having upper ends rigidly connected to the upper ring, and bridges connecting lower ends of the legs in pairs, at least some bridges comprising a flexible tab configured to engage under a flange of the vial. The housing further includes a second elastomer material forming a stopper configured to seal the vial when the flexible tabs engage under the flange. At least one inner face of the upper ring made of the first material is rigidly connected to the stopper made of the second material.

19 Claims, 4 Drawing Sheets

BI-INJECTION MOLDED HOUSING OF A LOCKING CAP FOR A PHARMACEUTICAL VIAL, AND LOCKING CAP INCLUDING SUCH A HOUSING

PRIORITY CLAIM

This application claims the benefit of the filing date of French Patent Application Serial No. FR2300929, filed Feb. 1, 2023, for "Bi-Injection Molded Housing of a Locking Cap for a Pharmaceutical Vial," the disclosure of which is hereby incorporated herein in its entirety by this reference.

TECHNICAL FIELD

The present disclosure relates to a locking cap for a vial comprising a neck, the cap being intended to block a stopper in the neck or on a flange of the vial. The present disclosure relates in particular to a bi-injection molded housing forming part of the cap and formed from two materials so as to integrate the function of the stopper.

BACKGROUND

A vial for medical or pharmaceutical use is usually sealed by a cap made of elastomeric material that is secured on the vial by a locking cap as described in documents EP2464577A1 or FR3098504A1, and illustrated in FIGS. 1A and 1B. The locking cap 100' comprises an external body 30, a housing 20' and an upper capsule 40. The base 11 of a stopper 10' is pushed into the neck 201 of the vial 200 and held pressed, in this position, by the housing 20' that comes to grip under the flange 202 of the vial. The external body 30 is fixed to the housing 20' and prevents any access thereto, thus securing the closure of the vial 200. The upper capsule 40 is removable to allow access to the stopper 10' and the collection of the pharmaceutical solution contained in the vial 200, for example, using a syringe. To allow access to the stopper 10', the external body 30 and the housing 20' of the locking cap 100' each comprise an opening at their respective upper faces, an opening that is closed by the capsule 40 until it is removed.

Before being attached to the vial 200 with the stopper 10', the locking cap 100' may be provided alone or associated with the stopper 10'. The housing 20' comprises an upper ring and a plurality of legs connected to the upper ring and defining therewith a generally cylindrical shape, it also comprises a plurality of bridges, each connecting two adjacent legs. Some bridges bear a flexible and inclined tab 24' relative to the legs toward the inside of the housing 20', in the direction of the upper ring. These tabs 24' are intended to block the stopper 10' inside the housing 20', against the upper ring, when the stopper 10' is connected to the cap 100'. The tabs 24' flex to allow the head 12 of the stopper 10' to pass when the stopper is introduced into the housing 20', and become blocked under the head 12 in order to prevent the stopper 10' from being pulled out of the housing 20'.

A risk related to this plug-housing association is that the tabs 24' damage the elastomer material of the stopper 10' due to their potentially projecting edges.

Another disadvantage can be due to the fact that the tolerances of the dimensions of the stopper 10' or variations in dimensions or hardness of the stopper 10' from one supplier to another, can modify the compression of the stopper 10' against the flange 202 of the vial, by the housing 20' of the locking cap, and thus impact the sealing of the closure.

BRIEF SUMMARY

The present disclosure proposes a solution that aims to remedy all or some of the stated problems. The present disclosure relates to a bi-injection molded housing for a locking cap, composed of two different materials and integrating the function of the stopper.

The present disclosure relates to a bi-injection molded housing of a locking cap for a pharmaceutical vial, composed of:

- a first material that forms an upper ring, legs of which the upper ends are rigidly connected to the upper ring, and bridges that connect the lower ends of the legs in pairs, at least some bridges comprising a flexible tab intended to engage under a flange of the vial, and
- a second elastomer material that forms a stopper configured to seal the vial when the flexible tabs engage under the flange,
- at least one inner face of the upper ring made of the first material being rigidly connected to the stopper made of the second material.

According to advantageous and non-limiting features of the present disclosure, either individually or in any technically feasible combination:

- the stopper comprises a base that is dimensioned for being inserted into the neck of the vial, and a head that is rigidly connected to an inner face of the upper ring and, advantageously, also rigidly connected to a portion of an inner face of each leg;
- the base has a generally cylindrical shape and comprises a window in its cylindrical wall that opens out on the side of its free end;
- the base has a V-shaped shape and comprises a rectangular free end wherein a slot is arranged;
- the stopper consists only of a head that is rigidly connected to an inner face of the upper ring and, advantageously, also rigidly connected to a portion of an inner face of each leg;
- the head of the stopper extends into a central hole of the upper ring until flush with an outer surface of the ring delimiting the central hole;
- the base of the stopper has a generally cylindrical shape, is recessed and comprises a cavity that also extends into the head so as to limit a central thickness of the head to be passed through along a main axis of the housing;
- the head of the stopper comprises at least one recess and at least one shoulder that are complementary to at least one shoulder and at least one recess defined on the inner face of the upper ring and/or of the legs;
- the first material is made of polycarbonate;
- the second material is selected from among silicone and a thermoplastic elastomer material;
- the second material has a hardness between 20 and 45 Shore A.

The present disclosure also relates to a locking cap for a pharmaceutical vial comprising:

- a bi-injection molded housing as above,
- an external body that surrounds the housing and is fixed thereto, the external body comprising an opening in its upper face, the opening being centered on and surrounding a central hole of the upper ring of the housing,
- a capsule held on an upper face of the outer body for closing the opening and preventing access to the stopper.

BRIEF DESCRIPTION OF THE DRAWINGS

Other features and advantages of the present disclosure will emerge from the following detailed description of embodiments according to the present disclosure with reference to the appended figures, in which.

In the description, the same references in the figures may be used for elements of the same type.

DETAILED DESCRIPTION

Figure 1A:
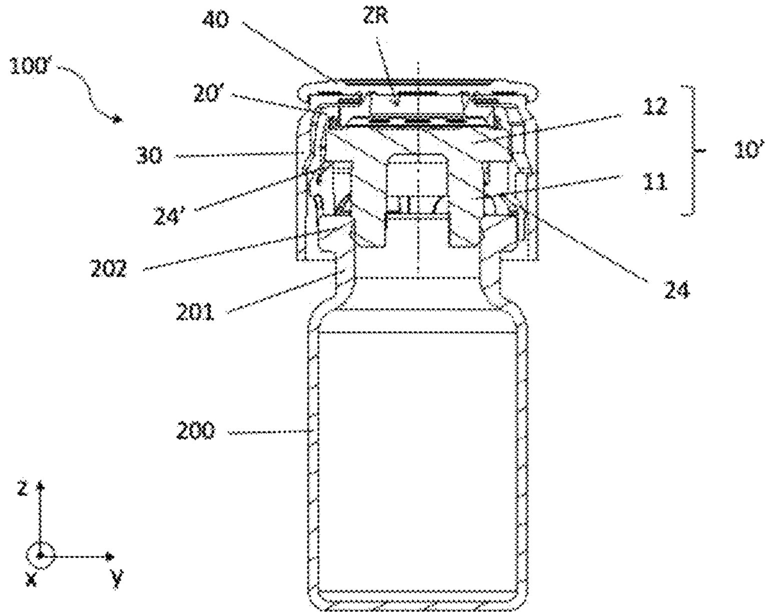
FIGS. 1A and 1B show a locking cap on a vial, in an intermediate holding position (FIG. 1A) and in a locking position (FIG. 1B), according to the prior art.
Figure 1B:
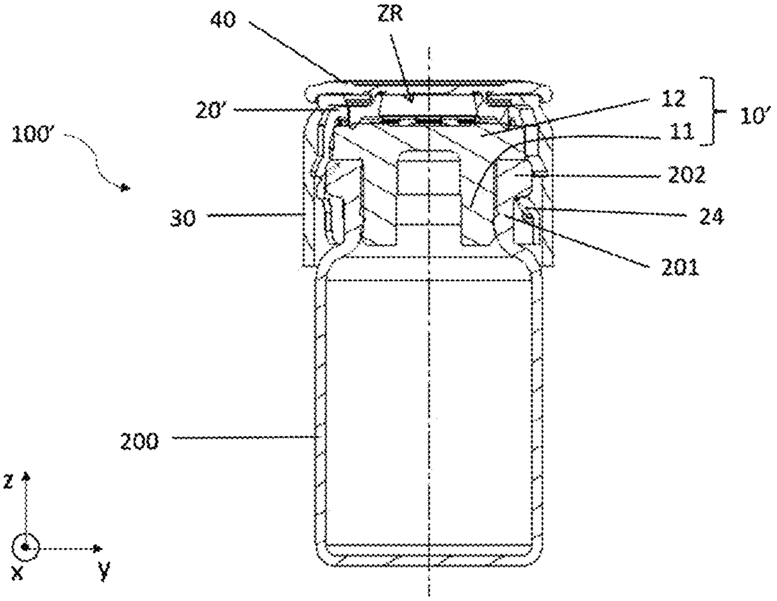

The present disclosure relates to a locking cap 100 for a vial 200 with a neck. The vial 200 has a neck 201 of circular opening, ending with a collar or flange 202 flared relative to the outer perimeter of the neck 201, as shown in FIGS. 1A and 1B of the prior art. In the field of pharmaceutical applications, there are standards in terms of the internal diameter of the neck 201 of the vial 200: 13 mm and 20 mm are examples of this. The cap 100 is intended to block a stopper 25 in the neck 201 or against the flange 202 of the vial 200 to seal it hermetically.

When it is associated with the vial 200, the locking cap 100, as is known per se, can adopt two positions on the vial: a first position, called the intermediate holding position, wherein it remains removable, in a similar way to the illustration in FIG. 1A. It can also adopt a second position, called the locking position, wherein it is locked onto the vial 200, in a similar way to the illustration in FIG. 1B, and hermetically closes the vial 200.

Figure 2A:
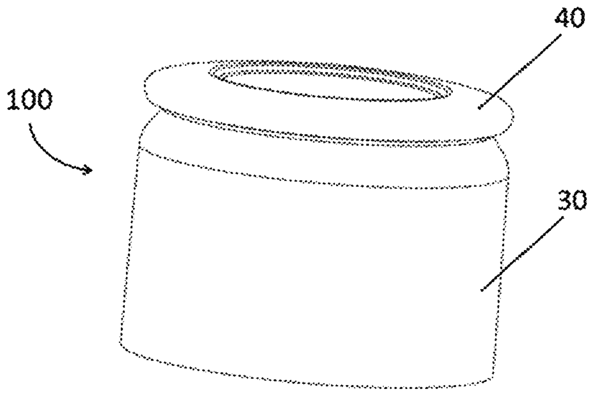
FIGS. 2A-2C show all or part of a locking cap according to the present disclosure, perspective view (FIG. 2A), truncated view with only the external body and capsule (FIG. 2B), perspective views with only a bi-material housing according to the present disclosure (FIG. 2C)
Figure 2B:
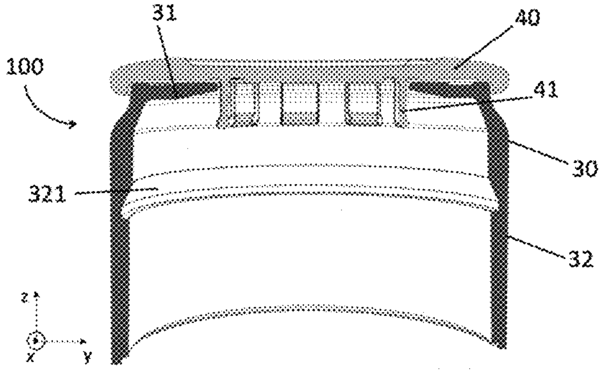
Figure 2C:
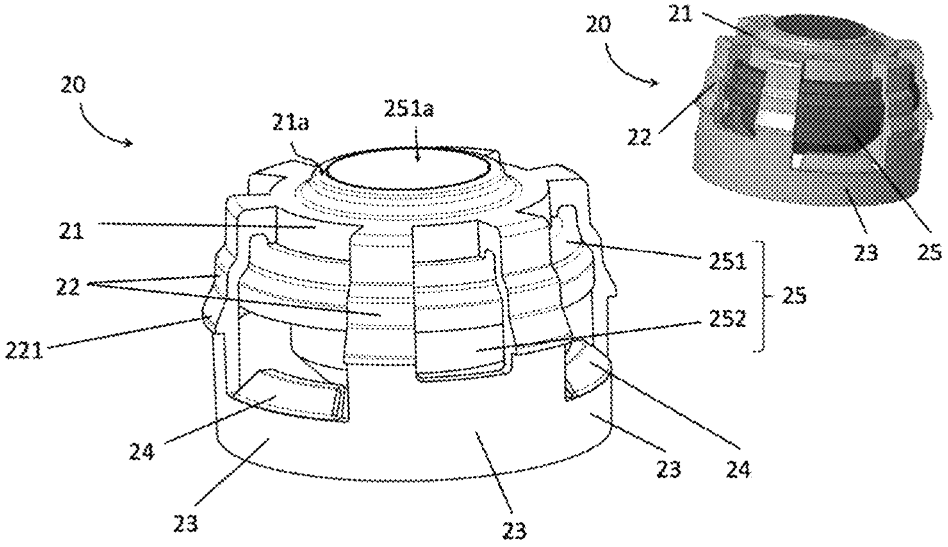

The locking cap 100 comprises a capsule 40, an external body 30 and a housing 20 (FIGS. 2A-2C). The originality of the locking cap 100, relative to those of the prior art, comes from its housing 20. It is formed of a first material defining an upper ring 21, legs 22 whose upper ends are rigidly connected to the upper ring 21, and bridges 23 connecting the lower ends of the legs 22 two-by-two. These elements give the housing 20 a generally cylindrical shape centered on a main axis z. The upper ring 21 has a central hole delimited by an outer surface 21*a*, usually circular.

As can be seen in FIG. 2C, at least some bridges 23 comprise a tab 24 that is flexible and is inclined relative to the legs 22 toward the inside of the housing 20, at an angle of between 20° and 60°, advantageously around 30°, in the direction of the upper ring 21. These tabs 24 remain above the flange 202, to be slightly raised or to be in contact therewith, when the cap 100 is in the intermediate holding position. They are intended to bear under the flange 202 of the neck 201 of the vial 200 when the cap 100 is in the locking position.

Figure 3A:
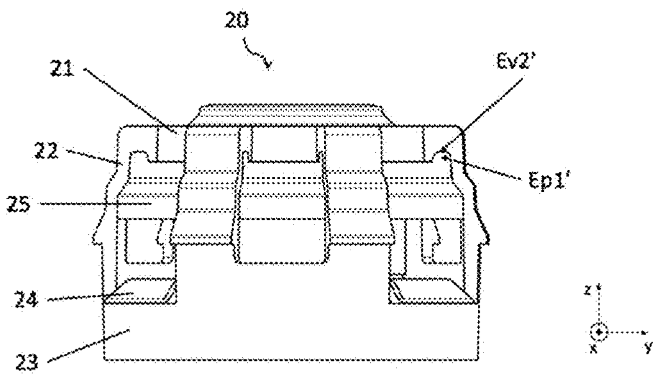
FIGS. 3A and 3B show a first variant of a bi-material housing according to the present disclosure, FIG. 3A being a side view and FIG. 3B being a sectional view.
Figure 3B:
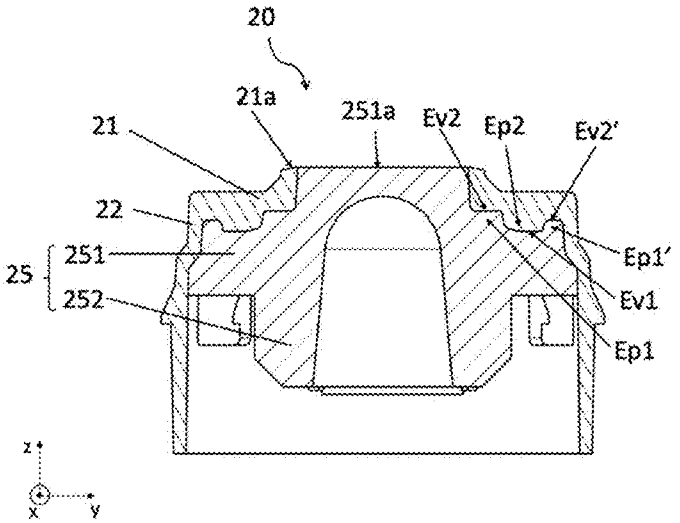
Figure 5:
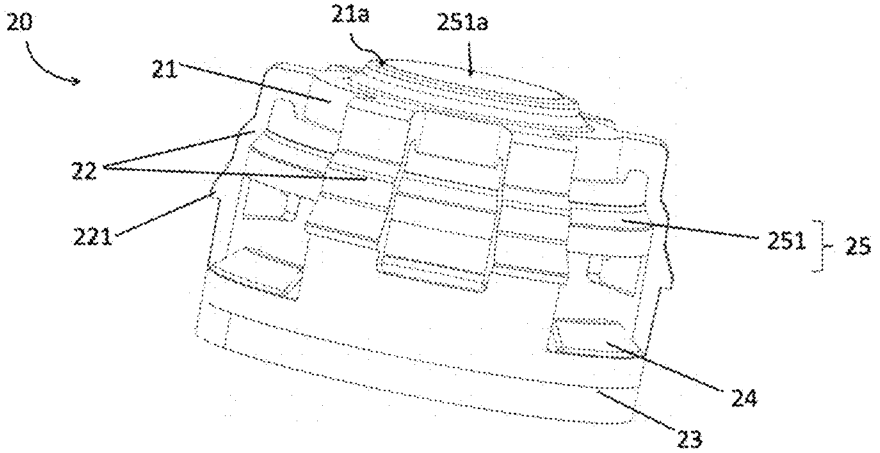
FIG. 5 shows a third variant of a bi-material housing according to the present disclosure, seen in perspective view from the side.

The housing 20 is further formed of a second material, an elastomer, defining a stopper 25 configured to seal the vial 200, when the flexible tabs 24 are gripped under the flange 202, that is to say in the locked position of the cap 100 on the vial. At least one inner face (that is to say a face oriented toward the interior of the housing) of the upper ring 21 made of a first material is rigidly connected to the stopper 25 made of a second material. Advantageously, in addition to the inner face of the upper ring 21, a portion of an inner face of the legs 22 is also rigidly connected to the stopper 25, as shown in FIGS. 3A, 3B, 5.

As will be described below, the bi-material housing 20 is formed by plastic bi-injection molding.

According to a first variant (FIGS. 3A, 3B), the stopper 25 of the housing 20 comprises a base 252, of generally cylindrical shape, sized to enter and close the neck 201 of the vial 200. The stopper 25 also comprises a head 251 secured to the inner face of the upper ring 21 and, preferentially, also rigidly connected to a portion of the inner face of each leg 22.

By way of example, for a conventional vial 200, the inner diameter of the neck 201 of which is 13 mm, the diameter of the base 252 may be 13.2 mm. When the base 252 is fully pushed into the neck 201, in the locked position, the head 251 is held bearing on the flange 202 of the vial 200 with a certain level of compression and participates in the sealing of the closure. The base 252 can have different lengths, along the main axis z, for example, between 2.5 mm and 7.5 mm.

Figure 4:
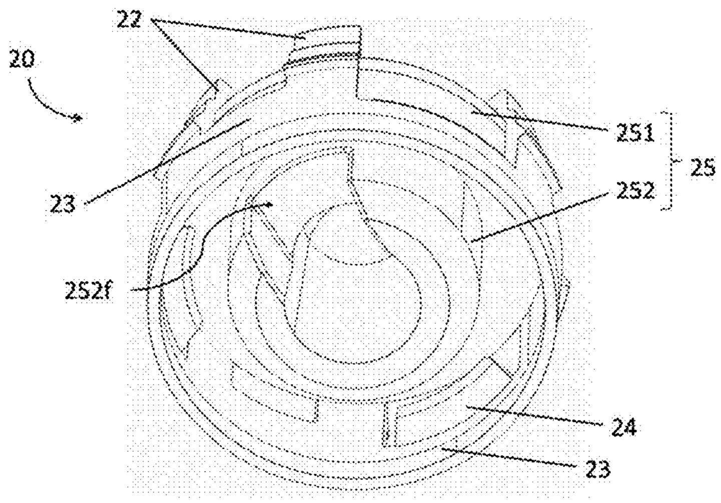
FIG. 4 shows a second variant of a bi-material housing according to the present disclosure, seen in perspective view from below.

According to a second variant (FIG. 4), the stopper 25 also comprises a base 252 and a head 251, the latter being rigidly connected to the inner face of the upper ring 21 and, advantageously, also rigidly connected to a portion of the inner face of each leg 22.

This variant is particularly suitable when the contents of the vial 200 are intended to be freeze-dried, before sealing. Indeed, the base 252 of the stopper 25 has a window 252*f* in its cylindrical wall opening on the side of its free end, to allow the passage of the evaporator flows from the inside of the vial 200 outwardly, as long as the base 252 is not fully pushed into the neck 201, that is to say in the intermediate holding position of the locking cap 100. Optionally, at least the bridge 23 opposite this window 252*f* may comprise an open space, so as to further facilitate the evaporation flows. For example, the open space may be similar to that proposed in document FR3098504A1. It should be noted that the option consisting of arranging an open space in at least one bridge 23 of the housing 20 can also be implemented within the scope of the first variant or else of the third variant described below, when it is provided to freeze-dry the contents of the vial 200, with the locking cap 100 in the intermediate holding position.

According to a third variant, the stopper 25 comprises only a head 251, without a base 252. The head 251 is rigidly connected to the inner face of the upper ring 21 and, advantageously, also rigidly connected to a portion of the inner face of each leg 22, as shown in FIG. 5.

In this configuration, it is only the compression of the head 251 against the flange 202 of the vial 200, in the locking position of the cap 100, which ensures the sealing.

According to a fourth variant (FIG. 6), the stopper 25 comprises a head 251 and a base 252 with a profiled V shape. Even if the other elements of the housing 20 (ring 21, legs 22, bridges 23, tabs 24) are not shown in FIG. 6 to facilitate the viewing of the stopper 25, they are clearly part of the housing 20 according to this variant and the head 251 is here again rigidly connected to the inner face of the upper ring 21 and, advantageously, also rigidly connected to a portion of the inner face of each leg 22. The free end 252*b* of the base 252 is rectangular and comprises a slot, through which a pipette can be inserted, for example, to sample the solution contained in the vial 200, after removing all or some of the locking cap 100. The particular configuration of the base 252 makes it possible to maintain a seal when the pipette is removed.

In the various variants mentioned, the sealing of the vial 200 is ensured by inserting the base 252 into the neck 201 (when the base is present) and by compressing the head 251 of the stopper 25 against the flange 202 when the tabs 24 of the housing 20 are gripped under the flange 202. The thickness of the head 251 (along the main axis z) in line with the upper ring 21 of the housing 20, which thickness will also be in line with the flange 202 in the locking position of the cap 100, must therefore be precisely adjusted with the positioning of the tabs 24. The hardness of the second material forming the head 251 of the stopper 25 is also an important parameter. The thickness and the hardness of the head 251 must be able to absorb the thickness tolerances of the flange 202 of the vial 200; they must also ensure that the upper ring 21 of the housing 20 brings the head 251 into compression against the flange 202, to guarantee sealing, when the tabs 24 are gripped under the flange.

Advantageously, the hardness of the second material is between 20 and 45 Shore A.

The features of the two-material housing 20 therefore give it the double function of a stopper 25 to seal the vial 200 and a member for locking the cap on the vial 200.

As mentioned above, the first material and the second material of the housing 20 are bi-injected, that is manufactured from a known method of bi-injection molding or bi-material plastic injection molding. Such a method makes it possible to produce on a single press, with a single tool, a part (the housing 20) composed of two materials with different characteristics.

The fact that the two materials are bi-injected guarantees perfect adjustment of the dimensions and excellent securing between the various elements constituting the housing 20, namely the stopper 25, and the upper ring 21, the legs 22, the bridges 23 and the tabs 24 on the other hand.

Figure 6:
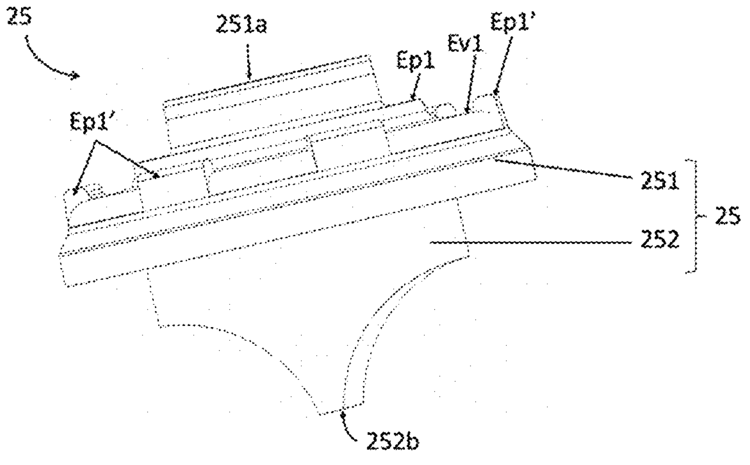
FIG. 6 shows a fourth variant of a part of the bi-material housing according to the present disclosure: the perspective view only comprises the stopper of the housing in order to facilitate the viewing of its shape.

The second material may be chosen from silicone or a thermoplastic elastomer material (TPE), materials having a low extractable profile (that is, few or no components thereof are likely to migrate into the pharmaceutical solution contained in the vial 200). The first material is advantageously polycarbonate, due to its mechanical strength. The fastening between the first and the second material may be of chemical and/or mechanical nature. It will be of chemical nature if the two materials used are able to adhere together, during bi-injection molding. In general, a mechanical fastening is implemented (with or without chemical contribution to the fastening) by defining retaining means and complementary notches at the surfaces of the two materials that are in contact. Typically, the head 251 of the stopper 25 comprises at least one first recess Ev1 and at least a first shoulder Ep1,Ep1', complementary to at least one second shoulder Ep2 and at least one second recess Ev2,Ev2' defined on the inner face of the upper ring 21 or on the inner face of the legs 22 (FIGS. 3A, 3B). The recesses and shoulders may be circular or extend only locally on the faces in contact, as can be seen in FIG. 6.

Advantageously, the head 251 of the stopper 25 extends into the central hole of the upper ring 21, until the outer surface 21*a* of the ring 21 is flush (FIGS. 2C, 3B). The upper surface 251*a* of the head 251 being at the same level, along the main axis z, as the outer surface 21*a*, there is no retention zone for liquid(s) or particle(s) in the central hole, a retention zone ZR that exists in the locking caps of the state of the art (FIGS. 1A and 1B). Such an area may pose problems of contamination when the contents of the vial 200 are removed by inserting a collection needle through the stopper 25, at the central hole of the upper ring 21.

Also advantageously, the base 252 of the stopper 25 (when it is present and has a generally cylindrical shape) is hollowed out and comprises a cavity that can also extend into the head 251, in particular when the upper surface 251*a* of the head 251 is flush with the outer surface 21*a* of the upper ring 21, so as to limit the central thickness to be passed through along the main axis z by a sample-collection syringe (FIG. 3B). This central thickness to be passed through is intended to be identical to the usual thickness to be passed through of stoppers of the prior art (typically between 1 mm and 5 mm), so that the user does not perceive a difference during collection, regardless of the type of stopper and/or locking cap.

The locking cap 100 therefore comprises the bi-injection molded housing 20 previously described, as well as an external body 30 and a capsule 40. The external body 30 is configured to completely surround the housing 20, so as to prevent any access to the housing 20 from the outside, when the cap 100 locks the vial 200. The external body 30 has a general cylindrical shape; it is defined by an upper face 31 and a cylindrical wall 32 centered on a main axis z (FIG. 2B). The free end of the cylindrical wall 32 defines an opening, adapted to accommodate the housing 20, before the positioning of the cap 100 on the neck 201 of the vial 200. Another opening, called the upper opening, is provided in the upper face 31.

The external body 30 is attached to the housing 20, for example, by cooperation of lugs 221 with a complementary groove 321 arranged on the inner face of the cylindrical wall 32 of the body 30 (FIGS. 2B, 2C). The upper opening is centered on and surrounds a central hole of the upper ring 21 of the housing 20.

The capsule 40 held on an upper face 31 of the external body 30 for closing the upper opening and preventing access to the head 251 of the stopper 25. As shown in FIG. 2B, the capsule 40 may comprise a plurality of tabs 41, arranged in the upper opening of the body 30. These tabs 41 are then deformed to be pressed against the inner surface of the upper face 31, that is to extend substantially in the plane (x, y). The capsule 40 can be attached to the body 30 by shaping. After this step, the housing 20 can be inserted into the body 30 to be fixed axially thereto by cooperation of the lugs 221 with the complementary groove 321. The locking cap 100 thus assembled can then be arranged in the intermediate holding position and then in the locking position on the vial 200 to be sealed.

The external body 30 and the capsule 40 may be made of materials such as polycarbonate (PC), polypropylene (PP) or polybutylene terephthalate (PBT). Advantageously, the capsule 40 is formed from flexible plastics materials, such as polypropylene (PP), in order to make it easier to grasp. It is recalled, in fact, that when the user wishes to withdraw the contents of the vial 200 sealed by the locking cap 100, that person applies a force to the capsule 40 to remove it and thus have access to the stopper 25, via the upper opening of the body 30.

By virtue of the features of the locking cap 100 according to the present disclosure, and in particular thanks to the features of the bi-injection molded housing 20 with a dual function, the number of elements to be assembled to form the cap 100 is limited, the problems related to the uncertainties or variabilities of dimensions between the elements, in particular between an independent stopper and a conventional housing, are solved, and finally the disadvantages and risks of damaging the cap by its mechanical association in a conventional housing are eliminated.

Naturally, the present disclosure is not limited to the embodiments and examples that have been described, and it is possible to add alternative embodiments thereto without departing from the scope of the invention as defined by the claims.

What is claimed is:

1. A bi-injection molded housing of a locking cap for a pharmaceutical vial, comprising:
- a first material forming an upper ring, legs having upper ends rigidly connected to the upper ring, and bridges connecting lower ends of the legs in pairs, at least some bridges comprising a flexible tab configured to engage under a flange of the vial; and
- a second elastomer material forming a stopper configured to seal the vial when the flexible tabs engage under the flange;
- wherein at least one inner face of the upper ring made of the first material is rigidly connected to the stopper made of the second material;
- wherein the stopper comprises a head rigidly connected to an inner face of the upper ring, and the head of the stopper comprises at least one recess and at least one shoulder that are complementary to at least one shoulder and at least one recess defined on the inner face of the upper ring and/or of the legs.

2. The housing of claim 1, wherein the stopper further comprises a base sized and configured to be inserted into the neck of the vial.

3. The housing of claim 2, wherein the head is also rigidly connected to a portion of an inner face of each leg.

4. The housing of claim 2, wherein the base has a generally cylindrical shape and comprises a window in a cylindrical wall of the base that opens on the side of a free end of the base.

5. The housing of claim 2, wherein the base has a V-shaped profile and comprises a rectangular free end in which a slot is disposed.

6. The housing of claim 2, wherein the head of the stopper extends into a central hole of the upper ring to a level flush with an outer surface of the ring delimiting the central hole.

7. The housing of claim 2, wherein the base of the stopper has a generally cylindrical shape, is recessed, and comprises a cavity extending into the head so as to limit a central thickness of the head to be passed through along a main axis of the housing.

8. The housing of claim 1, wherein the stopper consists essentially of the head that is rigidly connected to an inner face of the upper ring.

9. The housing of claim 8, wherein the head is also rigidly connected to a portion of an inner face of each leg.

10. The housing of claim 8, wherein the head of the stopper extends into a central hole of the upper ring to a level flush with an outer surface of the ring delimiting the central hole.

11. The housing of claim 8, wherein the base of the stopper has a generally cylindrical shape, is recessed, and comprises a cavity extending into the head so as to limit a central thickness of the head to be passed through along a main axis of the housing.

12. The housing of claim 1, wherein the first material is made of polycarbonate.

13. The housing of claim 1, wherein the second material is selected from among silicone and a thermoplastic elastomer material.

14. The housing of claim 1, wherein the second material has a hardness of between 20 and 45 Shore A.

15. A locking cap for a pharmaceutical vial, comprising:
- a bi-injection molded housing, including:
  - a first material forming an upper ring, legs having upper ends rigidly connected to the upper ring, and bridges connecting lower ends of the legs in pairs, at least some bridges comprising a flexible tab configured to engage under a flange of the vial, and
  - a second elastomer material forming a stopper configured to seal the vial when the flexible tabs engage under the flange,
  - wherein at least one inner face of the upper ring made of the first material is rigidly connected to the stopper made of the second material, and
  - wherein the stopper comprises a head rigidly connected to an inner face of the upper ring, and the head of the stopper comprises at least one recess and at least one shoulder that are complementary to at least one shoulder and at least one recess defined on the inner face of the upper ring and/or of the legs;
- an external body that surrounds the housing and is fixed thereto, the external body comprising an opening in an upper face of the external body, the opening being centered on and surrounding a central hole of the upper ring of the housing; and
- a capsule held on an upper face of the outer body for closing the opening and preventing access to the stopper.

16. The locking cap of claim 15, wherein the stopper further comprises a base sized and configured to be inserted into the neck of the vial.

17. The locking cap of claim 15, wherein the head is also rigidly connected to a portion of an inner face of each leg.

18. The locking cap of claim 15, wherein the stopper consists essentially of the head that is rigidly connected to an inner face of the upper ring.

19. A bi-injection molded housing of a locking cap for a pharmaceutical vial, comprising:
- a first material forming an upper ring, legs having upper ends rigidly connected to the upper ring, and bridges connecting lower ends of the legs in pairs, at least some bridges comprising a flexible tab configured to engage under a flange of the vial; and
- a second elastomer material forming a stopper configured to seal the vial when the flexible tabs engage under the flange;
- wherein at least one inner face of the upper ring made of the first material is rigidly connected to the stopper made of the second material;
- wherein the stopper comprises a head rigidly connected to an inner face of the upper ring, and the head of the stopper extends into a central hole of the upper ring to a level flush with an outer surface of the ring delimiting the central hole.

* * * * *